US012275618B2

(12) United States Patent
Castro Silva et al.

(10) Patent No.: US 12,275,618 B2
(45) Date of Patent: Apr. 15, 2025

(54) SHAFT DOOR WITH A DOOR GUARD ARRANGEMENT

(71) Applicant: Inventio AG, Hergiswil (CH)

(72) Inventors: Bruno Castro Silva, Sao Paulo (BR); Pietro Panegassi Picchiotti, Sao Paulo (BR); Murilo Lopes Santos, Sao Paulo (BR); Alberto Yoshiyuki Hosoda, Sao Paulo (BR); Marco Antonio Scherk Junior, Sao Paulo (BR); Gina Haruno Shida Matsumoto, Sao Paulo (BR)

(73) Assignee: INVENTIO AG, Hergiswil (CH)

( * ) Notice: Subject to any disclaimer, the term of this patent is extended or adjusted under 35 U.S.C. 154(b) by 13 days.

(21) Appl. No.: 18/556,105

(22) PCT Filed: Apr. 7, 2022

(86) PCT No.: PCT/EP2022/059178
§ 371 (c)(1),
(2) Date: Oct. 19, 2023

(87) PCT Pub. No.: WO2022/228847
PCT Pub. Date: Nov. 3, 2022

(65) Prior Publication Data
US 2024/0182270 A1 Jun. 6, 2024

(30) Foreign Application Priority Data
Apr. 28, 2021 (EP) .................................... 21170925

(51) Int. Cl.
*B66B 13/26* (2006.01)

(52) U.S. Cl.
CPC .................................... *B66B 13/26* (2013.01)

(58) Field of Classification Search
CPC ................................ B66B 13/26; B66B 13/28
See application file for complete search history.

(56) References Cited

U.S. PATENT DOCUMENTS

2021/0179390 A1 6/2021 Koketsu

FOREIGN PATENT DOCUMENTS

| | | | | | |
|---|---|---|---|---|---|
| CN | 103538993 A | * | 1/2014 | | |
| CN | 105858423 A | | 8/2016 | | |
| CN | 107150943 A | * | 9/2017 | ............. | B66B 13/26 |
| CN | 107879231 A | * | 4/2018 | | |
| CN | 109205447 A | * | 1/2019 | | |
| CN | 113291960 A | * | 8/2021 | ........... | B66B 13/146 |

(Continued)

OTHER PUBLICATIONS

Machine translation of CN 107150943.*

*Primary Examiner* — Diem M Tran
(74) *Attorney, Agent, or Firm* — William J. Clemens; Shumaker, Loop & Kendrick, LLP

(57) ABSTRACT

A shaft door for an elevator has a door guard arrangement that includes a force sensor and a safety switch, wherein the force sensor comprises a contact unit and a spring mechanism with a spring. The force sensor senses a presence of an object clamped by the shaft door due to the shaft door closing wherein the contact element contacts the clamped object and transfers a force to the spring. The spring mechanism activates the safety switch to send a door-to-open command to a door operator of the elevator when the force transferred to the spring exceeds a stiffness of the spring.

15 Claims, 4 Drawing Sheets

(56) References Cited

FOREIGN PATENT DOCUMENTS

| | | | | | |
|---|---|---|---|---|---|
| CN | 115339990 | A | * | 11/2022 | |
| CN | 116924195 | A | * | 10/2023 | |
| EP | 2345618 | A1 | * | 7/2011 | ............. B66B 13/26 |
| KR | 101929838 | B1 | | 12/2018 | |
| WO | 2020084679 | A1 | | 4/2020 | |

* cited by examiner

1 DOOR GUARD ARRANGEMENT 2 FORCE SENSOR 3 SAFETY SWITCH
7 CONTACT ELEMENT 9 DOOR OPERATOR

SHAFT DOOR WITH A DOOR GUARD ARRANGEMENT

FIELD

The present invention relates to a shaft door with a door guard arrangement for an elevator. Furthermore, the invention relates to an elevator with such a shaft door.

BACKGROUND

As elevators are applied for transporting passengers along substantial vertical distances, strict safety requirements must be fulfilled. Such elevator features may comprise e.g. functions avoiding that an elevator car is displaced as long as the car door or an associated shaft door (also called a landing door) is open, or functions avoiding that the car door may be unlocked as long as the car is outside of a landing area, etc. Normally, there are two different kinds of elevator doors—an inside car door being seen from inside of an elevator car and a landing door being seen from outside of the elevator car. All automatic elevator doors are usually powered by a door operator installed on the elevator car so that the car door may open both itself and a landing door which is coupled with the car door.

The most common elevator injury is someone being struck by a closing elevator door. This is called a door strike injury or an elevator sandwiching accident, and they generally occur while somebody is entering the elevator car, the resulting injury could be severe, as the door's closing force or speed is quite high. The elevator doors should close safe that would make injury unlikely. The more serious situation is that the car begins to move when the elevator door is already closed with a clamped object which is not detected. An object that has been clamped means that this object cannot enter or exit through the elevator door or cannot be taken away from the elevator door. Currently, to prevent passengers from being clamped by an elevator door, the elevator door is equipped with a variety of safety devices like an optical sensor. The elevator door will reopen, or the elevator car may not drive if such an accident happened.

To ensure the safety of passengers entering and leaving an elevator car, an elevator door comprises normally photoelectric sensors or a so-called light curtain with multiple photodetectors and light transmitters (often infrared) along a vertical direction mostly in both the left and right sides of the surface of the door as shown in FIG. 1. Multiple light beams (light transmit path) can be formed across the door space (entrance to the elevator car) in many horizontal directions between the photodetectors and the light transmitters when the door is open. If a part of these light beams is interrupted, it will be detected as there is an obstacle (passenger or barrier) so that the door will stop closing and reverse open. For instance, it should automatically initiate the re-opening of the elevator door in the event of a person crossing the entrance during the closing movement of this door. However, these photodetectors and light transmitters are set at a fixed interval width, then an object like a rope-shaped object, e.g. a leash, often cannot be detected correctly.

Moreover, both of a mechanical protect device or a photoelectric protect device like a light curtain may be rendered inoperative in the last 20 mm of door closing gap. The protection hence depends on how big a clamped object or obstacle is. Normally, the protect device is able to only detect an obstacle with a diameter of minimum 50 mm. In addition, to prevent a possible maloperation of the elevator door due to such as dust or dirt, etc., the safety device is configured to recognize the existence of an obstacle only when not one, but a part of the light beam (light transmit path) is broken, and the light curtain shall cover the opening over the distance between at least 25 mm and 1600 mm above the elevator door sill. Therefore, an object with a small diameter like a rope-shaped object is more difficult to be detected accurately while the door is closing.

Since a long time ago, especially since the coronavirus (COVID-19) pandemic outbreak, it has been more and more a stressful and lonely time that many peoples have decided to adopt or buy pets. The pet population has been grown up worldwide. More and more people every day need to take elevators with their pets. But in many countries, there have been many elevator accidents with pets. For example, a dog hanging from its leash at an elevator door is found dead. The cause of this accident is that the dog's owner entered the elevator car without realizing that the dog was still outside. After the elevator door closed, the elevator car went up to the next floor. The dog was dragged upward by the moving car so that the dog's head hit the roof of this floor. The dog then had no chance of survival. In another reported accident, a pet dog that was on a leash with its owner entered an elevator car but went back unexpectedly from there to outside. This dog didn't manage to go back to the elevator car before the elevator door closed, because the owner, who stays inside the car, has not noticed this. However, the owner was still holding on to the dog's leash. It all happened very fast, and the owner had no time to react. The dog is strangled to death after its leash was trapped between the elevator door as the car moved away to the next floor.

Accordingly, there may be a need to enhance the safety of accessing an elevator car not only for passengers but also for small-sized objects like pets or animals. However, installing more photoelectric sensors in a shaft door to increase the number of light beams will make the entire door more complex and expensive. Moreover, the failure rate of the door will also increase.

SUMMARY

Such needs may be met with the advantageous embodiments that are defined in the following specification.

According to a first aspect of the invention, a shaft door with a door guard arrangement for an elevator is provided, wherein the door guard arrangement may comprise a force sensor and a safety switch, wherein the force sensor comprises a contact element and a spring mechanism with a spring. Such a spring is an elastic object that can store mechanical energy and release or transfer it when compressed, stretched, or twisted. The spring mechanism may activate the safety switch when the spring is compressed by the contact element. The force sensor can sense the presence of an object clamped by the shaft door in this manner when the force sensor is installed at this shaft door, wherein the contact element contacts the clamped object due to the shaft door closing so that the contact element is capable of transferring a force to the spring. The object is an obstacle that prevents the shaft door from completely closing. The clamping force of the shaft door acting on the object thus can be transferred by the contact element and further acted partially or completely at the spring. The spring mechanism can activate the safety switch for sending a door-to-open (DTO) command to a door operator of the elevator when the transferred clamping force to the spring exceeds the stiffness of the spring. The stiffness of the spring can be a bending, torsion, or compression stiffness. With this setting, the force sensor can detect the presence of an object clamped by the shaft door, and the door guard arrangement may ensure the elevator against an accident caused by a shaft door strike.

Such a door guard arrangement comprises a force sensor that contacts directly an object clamped by the elevator door. Even a string-like object, e.g. a pet leash, which is often ignored by an ordinary photoelectric sensor or a light curtain, can be detected safely because the force sensor detecting an object does not rely on the size of this object. Thus, door strike injury to pets can be avoided as far as possible, and the purpose of improving safety protection for pets is achieved without incurring excessive costs.

According to an embodiment of the invention, besides the spring, the spring mechanism may also comprise a mechanical element like a guide rod and/or an electrical unit e.g. a signal generator or a piezoelectric sensor, in order to activate the safety switch. According to this, the safety switch can be activated mechanically or electrically. Certainly, the spring mechanism may comprise only the spring that is able to directly activate the safety switch, e.g. the spring contacts the safety switch.

Advantageously, the spring mechanism can be connected wired or wirelessly with the safety switch. And the spring mechanism thus may activate the safety switch wired or wirelessly. This means that the safety switch can be set flexibly inside or outside of the shaft door.

According to a further embodiment, when there is no object clamped by the shaft door, the shaft door can close completely. In this case, the contact element is not contacted with the shaft door or contacted with the shaft door in this manner that a contact force transferred through the contact element to the spring does not exceed the stiffness of the spring. A contact force is any force that requires a contact to occur or remains this contact. For example, the contact element does not contact the shaft door or a shaft door frame in the way that a contact force caused, e.g. pressed by the closed shaft door and transferred through the contact element to the spring does not exceed the stiffness of the spring.

Generally, an elevator shaft door is installed in a door frame. And there are different types of shaft doors. For example, the shaft door may be a side-opening slide door consisting of at least one door panel. Such a shaft door can be a single opening door that only has a single door panel. The door panel opens to the left or right laterally. Alternatively, the shaft door may be constructed as a telescopic door consisting of more than one door panel. For such a shaft door, the force sensor of the door guard arrangement can be set at the frame of the shaft door. The contact element of the force sensor accordingly protrudes from the door frame to a door panel of the shaft door, wherein the door panel may comprise an interior space for receiving the contact element when the shaft door has closed completely.

Optionally, the shaft door can be constructed as a center-opening slide door consisting of at least two door panels. This kind of shaft door consists of two door panels that meet in the middle and slide open laterally. One advantage of such a shaft door is its high-efficiency operation so that the time needed to open or close the door is shorter. For such a shaft door, the force sensor of the door guard arrangement can be set at one of the door panels of the shaft door. In this case, the contact of the force sensor can be installed by the spring in the door panel and protrude from this door panel, and another door panel may comprise an interior space for receiving the contact when the shaft door has closed completely.

According to an embodiment, the contact element can be constructed as a bar with a length of the same, a mainly same height, or at least a half-height of the door panel. Such a contact element can be arranged along the side edge of the door panel.

According to an embodiment, the safety switch of the door guard arrangement can be connected with the door operator of the elevator via wired or wireless communication means, preferably over a network (e.g. internet or a local network like LAN), the door-open-command thus can be sent to the door operator of the elevator or other remote recipients, e.g. the main controller of the elevator.

According to an embodiment, the door operator may reopen the shaft door after the door operator has received the door-open-command. As the shaft door in this case cannot close, thus it will also prevent the elevator car from moving. And the spring may release itself and bring the contact element in its original position in which the contact element is not compressed. Therefore, an accident can be avoided if an object, e.g. a pet leash, is clamped by the shaft door when a pet and its owner are separated on both sides of the shaft door, namely inside and outside of the elevator car. Even if the shaft door cannot open again due to a malfunction, the car will not move away in this case.

According to a second aspect of the invention, an elevator door is provided that may comprise an afore-mentioned door guard arrangement.

According to a third aspect of the invention, an elevator is provided that may comprise an elevator door according to the second aspect of the invention.

Ideas underlying embodiments of the present invention may be interpreted as being based, inter alia and without restricting the scope of the invention, on the following observations and recognitions.

One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawings. However, neither the drawings nor the description shall be interpreted as limiting the invention.

The figures are only schematic and not to scale. Same reference signs refer to same or similar features.

DETAILED DESCRIPTION

Figure 1:
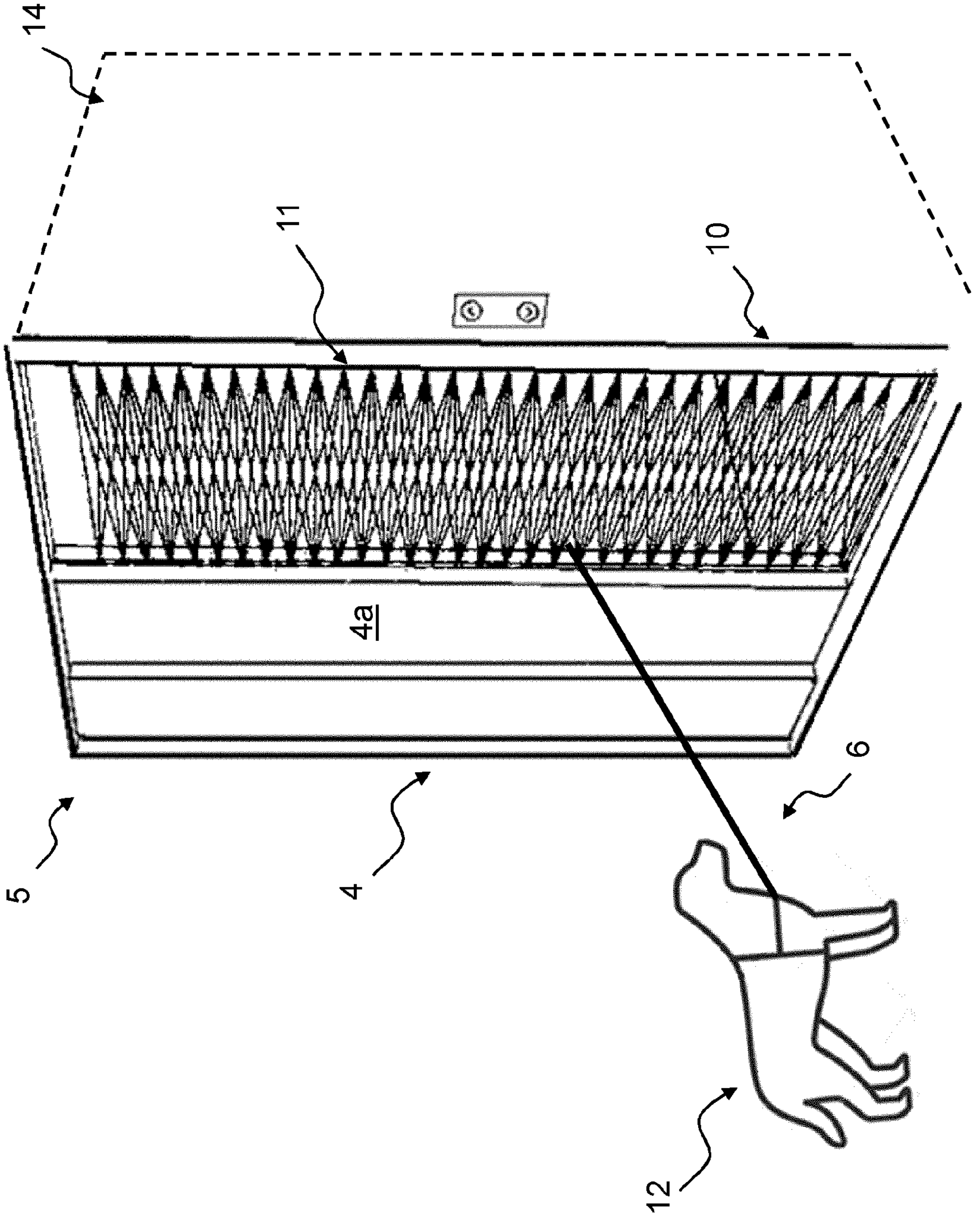
Fig. 1 (Prior Art)
FIG. 1 shows an elevator door according to the prior art.

FIG. 1 shows an elevator 5 with a slide shaft door 4, according to the prior art, which opens to left or right laterally. The shaft door 4 comprises a light curtain with many photodetectors and light transmitters 11 arranged separately in the doorframe 10 and the door panel 4*a* so that a multiple of light beams are formed horizontally across the door space at the entrance to the elevator car 14 when the shaft door 4 is open. The light beams form an invisible light net at the entrance. Just for the convenience of presentation, these light beams are illustrated in FIG. 1. If some light beams are broken during the shaft door 4 closing, the elevator 5 or the shaft door 4 may know that there is something in the door space. The shaft door 4 will either stop closing or at first open shortly and then try to close again.

The reliability of this light curtain is related to the number of the existing light beams. The more the number of these detectors/light transmitters 11, the more beams there are, and thus the better safety the shaft door has. However, there are still many spaces and gaps existing in the net formed by the light beams, especially in the place near the doorframe 10 and the door panel 4*a*. In case that some detectors or transmitters 11 are defective or obscured by dust, a rope-shaped object like a leash 6 could not be detected correctly. For example, a pet dog 12 on a leash 6 stays still outside of the car 14, but the pet's owner has entered the shaft door 4 which then began to close. If the dog cannot follow its owner into the elevator car 14, the leash 6 will be clamped by the shaft door 4. When the leash 6 is clamped in a gap of the light net, the light curtain cannot detect this leash, and thus the shaft door 4 will close. After the shaft door 4 is closed completely, the elevator car 14 will drive immediately to a destination floor. For some modern elevators with car levelling, an elevator car 14 may even begin to move away before an elevator door 4 has closed completely. If the owner has not noticed that his dog is not followed or cannot stop the elevator car 14 from moving immediately, this situation would lead to a serious accident to the dog 12.

Figure 2:
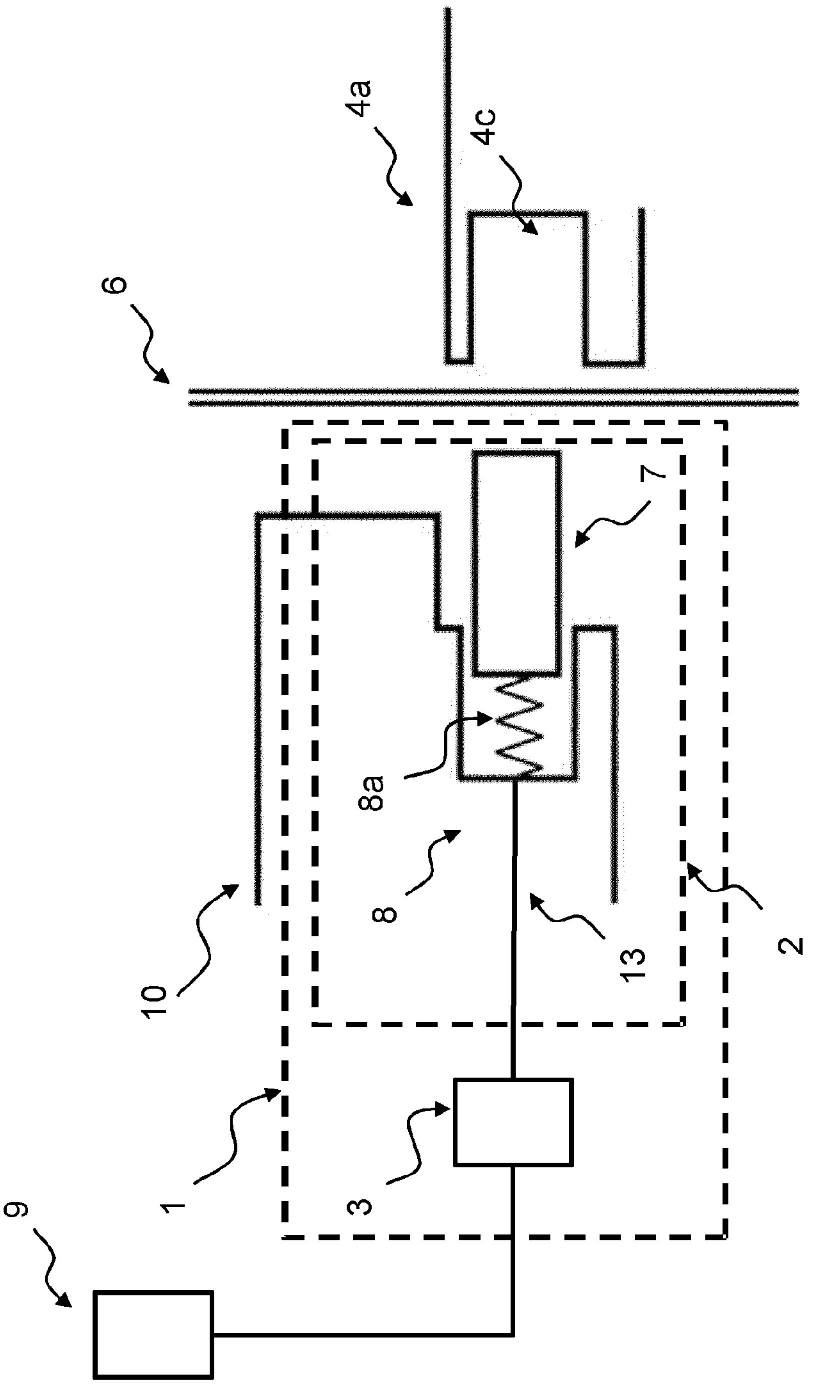
FIG. 2 shows a door guard arrangement according to the invention installed in an elevator door.

It is therefore proposed to provide a door guard arrangement 1 according to an embodiment of the present invention. Such a device 1 is shown in FIG. 2 within the range indicated by the outside dashed line. The door guard arrangement 1 comprises a force sensor 2 (also indicated by dashed line) and a safety switch 3, wherein the force sensor 2 comprises a contact element 7 and a spring mechanism 8 consisting of e.g. a helical spring 8*a* and a guide rod 13. Besides or instead of the guide rod 13, an electric unit like a piezoelectric sensor 13 can be also considered here. If the spring 8*a* is connected with a piezoelectric sensor, the spring mechanism 8 may activate the safety switch wirelessly. This means that the spring mechanism 8 can be connected wired or wirelessly with the safety switch 3 and accordingly activate the safety switch 3 wired or wirelessly. For this reason, the safety switch 3 can be set flexibly inside or outside of the shaft door 4. Alternatively, the spring mechanism 8 may of course comprise only the spring 8*a* that can directly activate the safety switch 3, e.g. the spring 8*a* contacts the safety switch.

The contact element 7 can be constructed as a long bar which can be arranged from the top to the bottom of the door frame 10. That is the reason that the contact element 7 may detect the presence of an object without relying on its size when this object is clamped by the door 4. Therefore, a thin pet leash can be detected by this force sensor 2. The length of the bar is e.g. as long as the same, a mainly same height, or at least a half-height of the door panel 4*a*. Even a shorter bar under certain circumstances is considerable if a minimum length requested by clients is fulfilled.

The force sensor 2 is integrated in the door frame 10. The contact element 7 protrudes partially from the door frame 10 so that the contact element 7 may sense the clamping force acting on an object 6 clamped between the door panel 4*a* and the door frame 10 when the shaft door 4 closes, even if the object is thin like a pet leash. But the contact unit 7 will not contact the door panel 4*a* or will just touch the door panel 4*a* slightly so that the force caused by the completely closed shaft door 4*a* will not exceed the stiffness of the spring 8*a* if there is no object in the space between the door frame 10 and the door panel 4*a*. With such an arrangement, the force sensor 2 thus can detect the presence of the object 6 when it is clamped by the shaft door 4. If the compressive force on the spring 8*a* exceeds its stiffness, through e.g. the rod or the piezoelectric sensor 13, the compressed spring 8*a* can activate the safety switch 3, and the safety switch 3 will send a door-to-open (DTO) command to a door operator 9 that can be either a controller of the shaft door 4 or a main controller of the elevator 5. The door guard arrangement 1, particularly the safety device 3, can be connected with the door operator 9 via wired or wireless e.g. WLAN. Then the door operator 9 may open the shaft door 4 or stop the shaft door 4 from closing. After the shaft door has opened, the spring 8*a* may release itself and push the contact element 7 in the original position in which no force is acted on the contact element 7.

Figure 3:
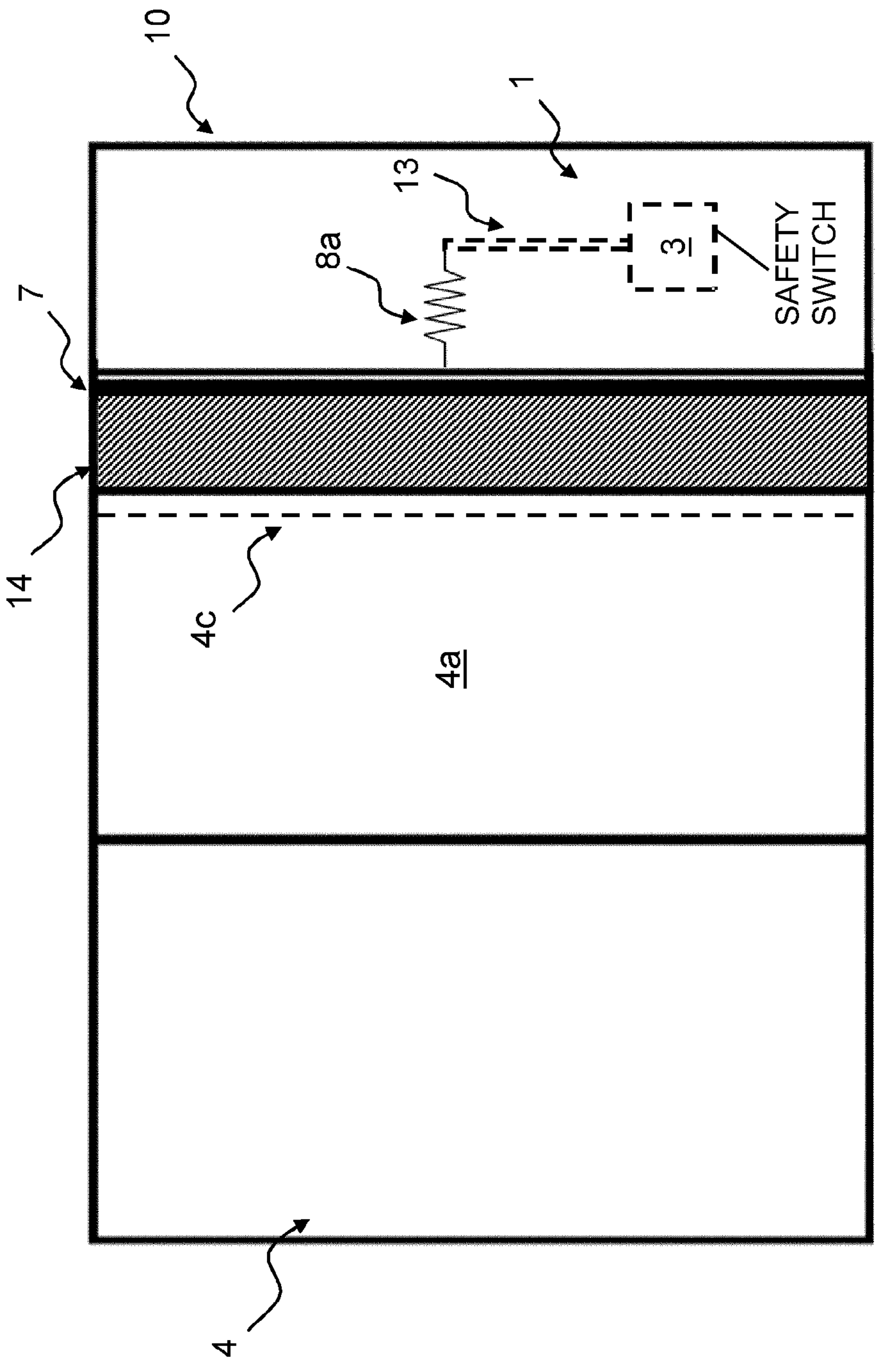
FIG. 3 shows a shaft door according to an embodiment of the present invention.

There are different types of shaft doors. FIG. 3 shows a slide shaft door 4 held in a door frame 10. The shaft door 4 consists of at least one door panel 4*a*. For such a shaft door 4, the door guard arrangement 1 can be integrated into the door frame 10 of the shaft door 4, wherein only the contact element 7 partially protrudes from the door frame 10 to the door panel 4*a*. The door panel 4*a* comprises accordingly an interior space 4*c* (also see FIG. 2) for receiving the contact element 7 when the shaft door 4 has closed completely. Of course, the door guard arrangement 1 may also set in the door panel 4*a*. Adapting to this, the door frame 10 comprises an interior space 4*c*. For this embodiment, the spring mechanism consists of a spring 8*a* and a rod 13, wherein the spring 8*a* may activate the safety switch 3 by the rod 13.

Figure 4:
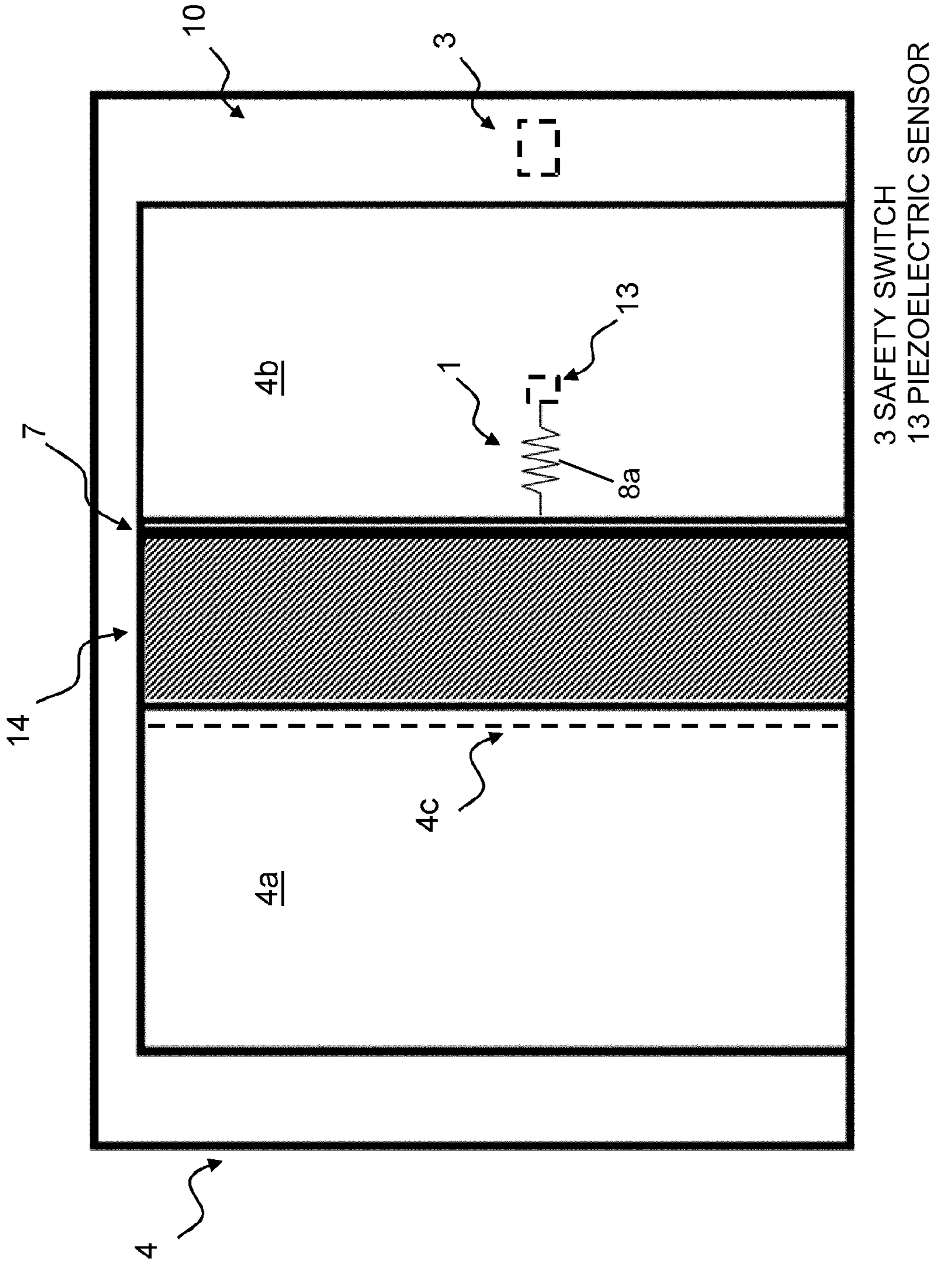
FIG. 4 shows a shaft door according to another embodiment of the present invention.

FIG. 4 shows another type of shaft door, e.g. a shaft door 4 which opens and closes from the middle of the door. This kind of shaft door 4 comprises two door panels 4*a*, 4*b*. The door guard arrangement 1 can be installed in one of the door panels 4*a*, 4*b*, e.g. in the door panel 4*b*. Particularly, the contact element 7 and the spring mechanism 8 can be set in the door panel 4*b*. Accordingly, the door panel 4*a* is constructed with an interior space 4*c* for receiving the contract element 7, which protrudes from the door panel 4*b*, when the shaft door 4 has closed completely. For this embodiment, the spring mechanism 8 consists of a spring 8*a* and a piezoelectric sensor 13 so that the spring 8*a* may activate the safety switch 3 electrically. Moreover, the piezoelectric sensor 13 can be connected with the safety switch 3 wirelessly. Therefore, the safety switch 3 does not need to be set in the door panel 4*b* too, it can be set also in the other door panel 4*a* or in the door frame 10 or outside of the shaft door 4. For this embodiment, the safety switch 3 is set in the door frame 10 and can be activated by the piezoelectric sensor 13 via a wireless signal.

Finally, it should be noted that the term "comprising" does not exclude other elements or steps and the "a" or "an" does not exclude a plurality. Elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A shaft door with a door guard arrangement for an elevator, the door guard arrangement comprising:

a safety switch;

a force sensor having a contact element and a spring mechanism with a spring, wherein the force sensor is installed at the shaft door and senses a presence of an object clamped by the shaft door by the contact element contacting the clamped object due to the shaft door closing, the contact element transferring to the spring a force generated when the object is contacted; and the spring mechanism activating the safety switch to send a door-to-open command to a door operator for the shaft door when the force transferred to the spring exceeds a stiffness of the spring.

2. The shaft door according to claim 1 wherein when the shaft door is closed completely either the contact element does not generate the force or the force transferred to the spring does not exceed the stiffness of the spring.

3. The shaft door according to claim 1 wherein the spring mechanism includes a mechanical element and/or an electrical unit that activates the safety switch.

4. The shaft door according to claim 1 wherein the spring mechanism is connected with the safety switch either wired or wirelessly.

5. The shaft door according to claim 1 wherein the shaft door is a side-opening slide door having at least one door panel.

6. The shaft door according to claim 5 wherein the force sensor is integrated in a door frame of the shaft door or in the at least one door panel.

7. The shaft door according to claim 6 wherein the at least one door panel has an interior space formed therein, the interior space receiving the contact element when the force sensor is integrated in the door frame.

8. The shaft door according to claim 6 wherein the door frame has an interior space formed therein, the interior space receiving the contact element when the force sensor is installed in the at least one door panel.

9. The shaft door according to claim 1 wherein the shaft door is a center-opening slide door having at least two door panels.

10. The shaft door according to claim 9 wherein the force sensor is installed in one of the at least two door panels.

11. The shaft door according to claim 1 wherein the contact element is a bar having a length in a range of a height of a door panel of the shaft door to a half-height of the door panel, and wherein the contact element is arranged along a side edge of the door panel.

12. The shaft door according to claim 1 wherein the safety switch is connected with the door operator of the shaft door via a wired or wireless communication means.

13. The shaft door according to claim 12 wherein the door operator reopens the shaft door after the door operator has received the door-open-command.

14. An elevator comprising:

the shaft door according to claim 13; and the door operator that operates the shaft door.

15. An elevator comprising:

a shaft door with a door guard arrangement;

a door operator that opens and closes the shaft door; and wherein the door guard arrangement has a safety switch and a force sensor, the force sensor including a contact element and a spring mechanism with a spring;

wherein the force sensor is installed at a door frame of the shaft door or in a door panel of the shaft door and the force sensor senses a presence of an object clamped by the shaft door by the contact element contacting the clamped object due to the shaft door closing, the contact element transferring to the spring a force generated when the object is contacted; and wherein the spring mechanism activates the safety switch to send a door-to-open command to the door operator when the force transferred to the spring exceeds a stiffness of the spring.

* * * * *